United States Patent Office 3,397,195
Patented Aug. 13, 1968

3,397,195
PREPARATION OF α-OLEFIN POLYMERS IN FINELY DIVIDED FORM
Carl A. Lukach, Wilmington, and Harold M. Spurlin, Cooper Farm, Del., assignors to Hercules Incorporated, a corporation of Delaware
No Drawing. Filed Dec. 18, 1964, Ser. No. 419,607
12 Claims. (Cl. 260—93.7)

ABSTRACT OF THE DISCLOSURE

A process is taught whereby α-olefins are polymerized directly to particles of less than 10μ average size using an organometallic catalyst. Two embodiments of the processes are taught. In one embodiment the catalyst is prepared by reducing titanium tetrachloride with an organometallic compound at a low temperature under agitation in the presence of an abrading solid material. The other embodiment comprises polymerizing the desired α-olefin under agitation in the presence of an abrading solid material using as catalyst a titanium compound prepared by reducing titanium tetrachloride at a low temperature with an organometallic compound but not in the presence of the abrasive. The preferred abrading material is sand.

---

The present invention relates to a process for preparing finely divided polymers of α-olefins, especially polypropylene, as direct products of polymerization.

Stereoregular polypropylene, sometimes called crystalline polypropylene or isotactic polypropylene, and other α-olefin polymers are made by suspension processes in which the olefin is polymerized in a liquid diluent to form a suspension of polymer particles in the diluent. These particles, commonly called flake, range in size from about 20 microns to 300 microns in diameter. There is a great need, however, for smaller particles for use in such applications as flatting agents for paints. Such smaller products are made commercially by mechanically grinding the polymer.

The present invention has for its object a process for the polymerization of α-olefins which gives as the direct product of the polymerization a polymer in the form of relatively uniform particles having an average size of less than about 10 microns.

The process of the invention has two different embodiments. In the first embodiment, the olefin monomer is polymerized in a liquid diluent in the presence of a titanium trichloride catalyst which has been prepared by reducing titanium tetrachloride with an organometallic compound at a temperature of about −80 to −20° C. under agitation and in the presence of a grinding agent such as sand, and then heat-treated at 60 to 150° C. In the second embodiment, the olefin monomer is polymerized in a liquid diluent under agitation in the presence of a grinding agent and in the presence of a titanium trichloride catalyst which has been prepared by reducing titanium tetrachloride with an organometallic compound at about −80 to −20° C., and finally heated-treated at 60 to 150° C. The common feature of the two embodiments is that there is employed a titanium trichloride catalyst prepared by reducing titanium tetrachloride with an organometallic compound at an especially low temperature and then heat-treated. In the first embodiment the grinding agent is employed in the preparation of the catalyst, and in the second embodiment the grinding agent is present during the polymerization. It is obvious, of course, that the two embodiments may be combined by conducting both the preparation and the catalyst polymerization in the presence of the grinding agent.

The product of polymerization from both embodiments is a polymer in the form of finely divided particles having an average size less than 10 microns. This result is not obtained if the catalyst is not prepared at the specified low temperature or if the grinding agent is not present either during preparation of the catalyst or during polymerization.

The term "titanium trichloride catalyst" is employed in the specification in a manner consistent with art terminology to connote catalytically active compositions in which titanium trichloride is co-crystallized with another metal halide, such as aluminum trichloride, or with aluminum trichloride and an alkylaluminum halide. Catalysts of this nature are well known in the art and are described inter alia in U.S. Patents 3,058,963 and 3,108,973 to E. J. Vandenberg.

In the first embodiment of the invention the titanium trichloride catalyst is prepared by reducing titanium tetrachloride with an organometallic compound in an inert liquid diluent at the relatively low temperature of −80 to about −20° C. in the presence of a comminuted grinding agent while vigorously agitating the reaction mixture. This method of preparing the catalyst is well known except for the presence of the grinding agent. The grinding agent can be any comminuted solid material having a particle size from about 0.01 to 10 mm. that is insoluble in the reaction mixture and which has a hard, abrasive surface. The preferred grinding agent is sand. Other grinding agents which can also be used include fused or sintered alumina, ceramics, metallic aluminum, and metallic titanium. The agent is preferably employed in an amount equal to about 20 to 60 volume percent of the reaction mixture. Both the presence of the grinding agent and the low reaction temperature are essential because if either condition is violated, the catalyst that is formed will not possess the ability to polymerize an α-olefin to the desired low particle size.

The organometallic compound used to reduce the titanium tetrachloride can be any of those known in the art, but is preferably an alkylaluminum compound such as a trialkylaluminum, a dialkylaluminum halide, or a mixture of dialkylaluminum halide and monoalkylaluminum halide, representative compounds being triethylaluminum, diethylaluminum chloride, diethylaluminum bromide, diethylaluminum iodide, and aluminum ethyl sesquichloride (an equimolar mixture of diethylaluminum chloride and monoethylaluminum chloride). The reaction may be carried out in any inert liquid diluent in which the organometallic compound and titanium tetrachloride are mutually soluble. Such diluents include, e.g., saturated liquid aliphatic hydrocarbons such as hexane, heptane, and the like, cycloaliphatic hydrocarbons, halogenated hydrocarbons, either aliphatic or aromatic, or any mixture of such diluents.

The reduction is carried out simply by mixing the titanium tetrachloride and organometallic compound in approximately stoichiometric proportions in the diluent at the prescribed temperature and allowing reaction to take place at that temperature until the majority of the titanium has been reduced to the trivalent state, the titanium trichloride catalyst being precipitated during the reaction. Agitation, of course, is essential, and the more vigorous the agitation, the more favorable the results. The agitation, in any event, should be at least sufficient to maintain the grinding agent well dispersed and in motion throughout the reaction mixture. After the majority of the titanium has been reduced to the trivalent state, it is possible to raise the temperature, say up to about 0° C., to allow the reaction to go to completion.

Following preparation of the catalyst, it is separated from the grinding agent and heat-treated at 60 to 150° C. for a minimum of a few minutes. It is then washed with hydrocarbon solvent and is ready for use in the polymerization of the α-olefin. It is a finely divided solid having a maximum particle size of less than about 4 microns.

Polymerization according to the first embodiment of the invention is carried out according to well-known procedures wherein the α-olefin is polymerized in a liquid diluent to form a suspension of polymer in the diluent. The titanium trichloride catalyst produced as above is used in combination with an activator which is desirably an alkyl-aluminum compound such as triethylaluminum, diethyl-aluminum chloride, or ethylaluminum sesquichloride. The polymerization is conducted by introducing the α-olefin into an inert liquid diluent, which can be any of those mentioned as useful in the catalyst preparation, in the presence of the titanium trichloride catalyst and activator. As known in the art, either the catalyst or activator or both may be added simultaneously with the olefin, and the molar ratio of aluminum to titanium may vary from about 0.5:1 to about 10:1. The polymerization temperature can conveniently range from about 0° C. up to any temperature below the temperature at which the particular polymer being made becomes soluble, and agitation need only be sufficient to disperse the olefin in the diluent. Since the polymerization process is in all respects well known in the art, it is believed unnecessary to encumber the specification with additional details.

In the second embodiment of the invention, preparation of the titanium trichloride catalyst is the same as in the first embodiment except that the grinding agent is omitted and agitation is less of a factor.

The polymerization step of the second embodiment is performed as in the first embodiment except that a grinding agent, as previously described, is present during the polymerization and the polymerization mixture is agitated sufficiently vigorously to maintain the grinding agent in suspension and in motion throughout the mixture. The grinding agent is desirably employed in an amount ranging from about 20 to 60% by volume of the polymerization mixture. It is, of course, possible, as previously mentioned, to combine the first and second embodiments by employing the grinding agent and vigorous agitation during both the preparation of the catalyst and the polymerization.

The process of the invention is applicable generally to α-olefins containing from 3 to 6 carbon atoms, especially propylene, 3-methyl-butene-1, and 4-methyl-pentene-1.

The following are examples of the invention:

Example 1

(a) Titanium trichloride preparation

A capped, 8-oz. pop bottle containing a magnetic stirring bar was alternately evacuated and pressured with nitrogen three times. n-heptane (30.0 ml.) and titanium tetrachloride (10.0 ml., 17.26 g., 0.091 mole) were added by hypodermic syringe, and the bottle was cooled to $-50°$ C. A solution of 36.4 ml. of $AlEt_2Cl$ (2.0 M in aluminum) (0.0728 mole) in 38 ml. of n-heptane was added slowly, with stirring. A clear, red-amber solution formed which was stirred for 4 hours at $-50°$ C. (the solution became opaque as the titanium trichloride formed) and then was stored, without stirring, at $-40°$ C. for 3.5 days. The bottle was gradually warmed to room temperature and was then stirred at 85° C. for 4 hours. The slurry was centrifuged. The upper liquid layer was removed by syringe and replaced with an equal volume of n-heptane. The bottle was shaken, centrifuged, and the top liquid layer was removed and replaced with n-heptane. The bottle was then once again shaken and centrifuged, and the top liquid layer was once again replaced with n-heptane. Microscopic examination of the titanium trichloride thus prepared indicated very uniform particles with a size of 1–3 microns. This catalyst was 0.925 M in titanium.

(b) Propylene polymerization

The polymerization reactor was a jacketed 1-liter glass resin kettle equipped with thermometer, paddle agitator, condenser and gas inlet line. Gas left the reactor by passing through the condenser and then through a calibrated rotameter so that its rate of flow could be determined. A rotameter was also attached to the gas inlet line so that the rate of flow of monomer being fed could be measured. Constant-temperature water was circulated through the outer jacket of the kettle to achieve the temperature desired. A manual valve was provided for adding small amounts of cold water to the constant-temperature water. The diluent employed was a mixture of paraffin hydrocarbons boiling in the range of about 180–200° C.

The reactor was evacuated and flushed with nitrogen. Ottawa sand (50–150 mesh, dried at 100° C. and cooled under nitrogen) was added to a depth of 2 inches (to just cover the blade of the paddle stirrer), and was washed with a mixture of 375 ml. of diluent (dried over molecular sieves) and 20 ml. of $AlEt_2Cl$ (2.0 M in aluminum, 0.040 mole). After stirring 15 min. at 60° C. under nitrogen, another equal increment of $AlEt_2Cl$ was added. After again stirring, the agitator was stopped and the upper liquid layer was removed. The sand remaining was washed with diluent. Enough diluent was then added, such that its total volume in the reactor was 750 ml.

$AlEt_2Cl$ (2.0 M in aluminum (9.0 ml., 24 mM.) and 9.74 ml. of the titanium trichloride (0.925 M in titanium), prepared as described above (12 mM), were added to the reactor under nitrogen. The mixture was stirred vigorously for 98 min. at 60° C. during which time the grinding action of the sand reduced the titanium trichloride particle size even further. The nitrogen was shut off and propylene was bubbled through the mixture at whatever rate was necessary to keep the off-gas flow rate constant at 300 cm.$^3$/min. The temperature was kept constant at 60° C. while propylene was added for 181 minutes. Aliquots of the slurry were removed periodically. The rate of polymerization was determined from the amount of polymer isolated from these aliquots, from the slope of the linear plot of g. polymer per liter versus time.

(c) Work-up

The polymerization was stopped by adding 13 ml. of butanol. The entire reaction mixture was poured into $CCl_4$ (2 liters). The sand settled to the bottom and the polymer slurry was decanted off. The sand was washed 3 times with n-heptane and the washings were added to the polymer slurry. The polymer slurry was centrifuged. The upper liquid layer was removed and the insoluble polymer was washed twice with methanol, once with acetone, and dried.

The insoluble polymer had a particle size range of 1–6 microns (average=3) and a reduced specific viscosity (RSV) determined on a 0.1% solution in decahydronaphthalene at 135° C. of 6.6. When the example was repeated but without the presence of sand in the polymerizer, the polymer had a particle size range of 5 to 40 microns (average=25).

Example 2

This run was a duplication of Example 1, using the same ingredients. The polymerization time was 104 minutes. Work-up was different. The final polymerization mixture was allowed to stand and the sand settled to the bottom. The polymer suspension was removed with a vacuum line. The sand was washed several times with n-heptane and the washings were added to the polymer suspension. The polymer suspension was centrifuged and the upper liquid layer removed. The insoluble polymer was washed twice with n-heptane, once with 2:1 methanol:heptane, once with methanol, and twice with acetone.

The insoluble polymer had a particle size range of 1–3 microns (average=2) and an RSV of 6.7.

EXAMPLE 3

(a) Titanium trichloride preparation

A 500 ml., 3-necked, round-bottomed flask equipped with a paddle stirrer and nitrogen inlet and outlet ports was flushed with nitrogen. Dry Ottawa sand was added to a depth of 1 inch to cover the blade of the stirrer. The sand was washed twice under nitrogen with a mixture of 100 ml. of n-heptane and 10 ml. of AlEt$_2$Cl (2.0 M in aluminum) (0.020 mole), and once with 100 ml. heptane. All liquid was removed after each washing but the sand retained about 70 ml.

Under nitrogen, n-heptane (50.0 ml.) and titanium tetrachloride (10.0 ml., 17.26 g., 0.091 mole) were added, and the flask was cooled to −60° C. Slowly, with vigorous agitation, AlEt$_2$Cl (36.4 ml. of 2.0 M) (0.0728 mole) which had been precooled to −60° C., was added. The purple slurry was stirred vigorously and slowly warmed to 0° C. over 1 hour. It was stirred at 0° C. for 2.5 hours. When the stirring was then stopped, the sand settled quickly. The suspension above the sand was removed by syringe and injected into a previously evacuated and nitrogen-flushed pop bottle. The bottle was stored at 0° C. overnight. It was then warmed to room temperature and heated at 80° C. for 6 hours. The rust-colored slurry was centrifuged. The upper liquid layer was removed and replaced with n-heptane three times, shaking and centrifuging between each washing. This catalyst was 0.625 M in Ti$^{+3}$ and had a particle size of 1–2$\mu$.

(b) Propylene polymerization

The same polymerization apparatus used in Example 1 was used, except that the resin kettle had a stopcock in the bottom for easy removal of aliquots. No sand was used in the reactor during the polymerization. The diluent was the same as in Example 2.

The reactor was evacuated and flushed with nitrogen. Diluent (750 ml.), previously dried over molecular sieves, was added. The diluent was saturated with propylene at 60° C., maintaining an off-gas flow rate of 300 cm.$^3$/min. AlEt$_2$Cl (9.0 ml. of 2.0 M, 18 mmoles, 24 mM.), and the titanium trichloride described above (14.4 ml. of 0.625 M, 9.0 mmoles, 12 mM.) were added (titanium after aluminum). Propylene was added at a rate to maintain the off-gas flow rate at 300 cm.$^3$/min. The temperature was maintained constant at 60° C. The polymerization was stopped after 305 minutes by adding 13 ml. of n-butanol. Aliquots were removed periodically during the run.

The polymerization mixture was centrifuged. The insoluble polymer was washed twice with n-heptane, once with methanol and once with acetone. It had a particle size range of 1–6 microns (average=3) and an RSV of 5.6.

When the example was repeated but without the addition of sand during preparation of the catalyst, the polymer had a particle size range of 5 to 40 microns (average=25).

EXAMPLE 4

(a) Titanium trichloride preparation

The apparatus and general procedure used in Example 3(a) was used. The sand was washed with (1) a mixture of 100 ml. heptane and 25.0 ml. of ethylaluminum sesquichloride (1.5 M. in aluminum, 37.5 mmoles), (2) 50 ml. of n-heptane, and (3) 20 ml. of 1.5 M ethylaluminum sesquichloride (30 mmoles). The sand retained 49 ml. of liquid.

The flask was cooled to −60° C. and titanium tetrachloride (10.0 ml., 0.091 mole) was added. After 10 minutes, 72.8 ml. of ethylaluminum sesquichloride (1.5 M in aluminum, 109 mmoles), which had been precooled to −60° C., was added slowly, while stirring vigorously.

While stirring, the mixture was kept at −60° C. for 15 minutes, warmed to −20° C. over one-half hour, kept at −20° C. for 1 hour, warmed to 0° C. over one-half hour, and kept at 0° C. for 2 hours. The catalyst slurry was removed from the sand as described in Example 3(a), and stored at 0° C. for 68 hrs. It was stirred at 85° C. for 4 hours and worked 3 times with n-heptane, as described in Example 3. The catalyst was 0.775 M in Ti$^{+3}$.

(b) Polymerization

The propylene polymerization was conducted in the same manner as Example 3(b), with 750 ml. of diluent, 9.0 ml. of 2.0 M AlEt$_2$Cl (24 mM.) and 11.6 ml. of the 0.775 M titanium trichloride (12 mM.) prepared above. Work-up was the same also. The insoluble polymer had a particle size range of 3–10 microns and an RSV of 5.1.

EXAMPLE 5

This was a duplication of Example 4, except for product work-up. This reaction mixture was washed at 60° C. with an aqueous sodium gluconate solution, and then with hot water until neutral. The mixture was filtered and the insoluble polymer was washed twice with n-heptane and was then stored as a slurry in n-heptane. The polymer had a particle size range of 3–18 microns (average=6) and an RSV of 6.3. When the example was repeated but without the addition of sand during preparation of the catalyst, the polymer had a particle size range of 11 to 150 microns (average=25–35$\mu$).

EXAMPLE 6

This run was analogous to Example 5 except that a mixture of propylene and hydrogen was used. The diluent was saturated with a mixture composed of 450 cm.$^3$/min. of propylene and 25 cm.$^3$/min. of hydrogen (5.27 volume percent hydrogen). The off-gas rotameter reading was noted. The aluminum and titanium compounds were added. During the polymerization both of these streams were fed constantly at the rates indicated above. In addition, propylene was fed from another rotameter at whatever rate was necessary to keep the off-gas rotameter reading constant at the noted original value. The product was worked up in the same manner as described for Example 5. The product had a particle size range of 3–18 microns (average=6) and an RSV of 2.3.

EXAMPLE 7

(a) Titanium trichloride preparation

The titanium trichloride was prepared in the same manner as in Example 4(a). The sand was washed twice with 25.0 ml. of 1.50 M ethylaluminum sesquichloride, and then with 50 ml. of n-heptane. The ingredients mixed at −60° C. as described in Example 4(a) were 20.0 ml. (34.5 g., 0.182 mole) of titanium tetrachloride and 146 ml. of 1.50 M ethylaluminum sesquichloride (0.219 mole aluminnum).

With vigorous stirring the reaction mixture was kept at −60° C. for 5 minutes, warmed to −30° C. (½ hour), kept at −30° C. for 1 hour and then successively at −20° C., −10° C. and 0° C. for 1 hour each. After removing the sand, the catalyst was stored at 0° C. for 16 hours. It was then stirred at 80° C. for 4 hours and was washed 3 times with n-heptane, as described in Example 3. The catalyst was 0.925 M. at Ti$^{+3}$.

(b) Polymerization

The polymerization was done, and the product was worked up in the same manner as described in Example 5. The product had a particle size range of 7–12 microns (average=7–9) and an RSV of 6.5.

EXAMPLE 8

The titanium trichloride was that prepared in Example 7. The polymerization was conducted with propylene and hydrogen, in the same manner described in Example 6. The particle size range of the polymer was 7–14 microns (average=8–9), and its RSV was 2.2.

EXAMPLE 9

The titanium trichloride used was that described in Example 7(a), and the apparatus was that of Example 3(b).

The apparatus was evacuated and flushed with nitrogen. Dry n-heptane (400 ml.) and 4-methyl-1-pentene (100 ml., 67 g.) were added under nitrogen, with stirring, followed by 6.0 ml. of 2.0 M AlEt$_2$Cl (24 mM.) and 6.49 ml. of 0.925 M titanium trichloride (12 mM.). The reaction temperature was kept at 29.5–31.5° C. for 239 minutes. Aliquots were removed periodically and indicated that all of the monomer was polymerized within 2 hours. The average rate was 9.0 g./hr./mmole titanium.

After adding 3.0 ml. of butanol containing 2000 p.p.m. water, the reaction mixture was heated to 70° C. and filtered. The insoluble polymer was washed twice on the filter with 50 ml. of hot heptane, and then with acetone containing 0.04 g. ditertiary butyl p-cresol. A portion of the dry product, mulled in tricresyl phosphate and examined microscopically, exhibited uniform spherical particles, 4–12 microns in size (average=4–7μ). A very few aggregates (37–70μ) (which could have been dirt particles) were also present.

EXAMPLE 10

This run used the same amounts of the same ingredients as that of Example 9 at 30° C., but sand was present in the reactor during the polymerization. The sand was first washed with AlEt$_2$Cl as described in Example 1(b), but n-heptane was used as diluent, the final volume of heptane being adjusted to 500 ml. The product was worked up as described in Example 9. The particle size range of the polymer was 5–9 microns and its RSV was 10.6.

EXAMPLE 11

This run was done in the same manner and with the same amounts of ingredients as Example 9, except that the monomer was 100 ml. (63 g.) of 3-methyl-1-butene, and the polymerization temperature was 18–20° C. The polymerization rate was very low. After 20.8 hrs., AlEt$_2$Cl and titanium trichloride equal to that used initially was added. The polymerization was stopped after a total of 28.3 hrs. The reaction mixture was worked up as described in Example 9. It had a particle size range of 4–7 microns.

EXAMPLE 12

This run was done in the same manner as Example 10, with sand in the reactor, but the monomer was 3-methyl-1-butene and the temperature was 17–18° C.

After washing the sand with AlEt$_2$Cl, the n-heptane was adjusted to a total volume of 200 ml., and then 100 ml. of monomer was added. AlEt$_2$Cl (21.6 ml. of 1.49 M, 96.7 mM.) and titanium trichloride (11.7 ml. of 0.925 M, 32.5 mM.) were then added and the mixture was stirred for 28.8 hours. The product was worked up as described in Example 9. The average particle size was approximately 1 micron.

What we claim and desire to protect by Letters Patent is:

1. A process for preparing α-olefin polymers in the form of relatively uniform particles having an average size of less than about 10 microns which comprises polymerizing the α-olefin in an inert organic liquid diluent in the presence of an organoaluminum activator and a titanium trichloride catalyst, said catalyst having been prepared by reducing titanium tetrachloride with an organoaluminum compound at a temperature of about −80 to −20° C. under agitation in the presence of a grinding agent comprising a comminuted solid material having a particle size from about 0.01 to 10 mm., insoluble in the reaction mixture and possessing a hard abrasive surface, and then heat-treating at 60 to 150° C.

2. A process for preparing α-olefin polymers in the form of relatively uniform particles having an average size of less than about 10 microns which comprises polymerizing the α-olefin in an inert organic liquid diluent under agitation in the presence of a grinding agent comprising a comminuted solid material having a particle size from 0.01 to 10 mm., insoluble in the polymerization mixture and having a hard, abrasive surface, and in the presence of an organoaluminum activator and a titanium trichloride catalyst, said catalyst having been prepared by reducing titanium tetrachloride with an organoaluminum compound at a temperature of −80 to −20° C., and then heat-treating at 60 to 150° C.

3. The process of claim 1 in which the α-olefin is propylene.

4. The process of claim 2 in which the α-olefin is propylene.

5. The process of claim 1 in which the grinding agent is sand.

6. The process of claim 2 in which the grinding agent is sand.

7. The process of claim 1 in which the organometallic compound is an alkylaluminum compound.

8. The process of claim 2 in which the organometallic compound is an alkylaluminum compound.

9. The process of claim 1 in which the α-olefin is 3-methyl-butene-1.

10. The process of claim 2 in which the α-olefin is 3-methyl-butene-1.

11. The process of claim 1 in which the α-olefin is 4-methyl-pentene-1.

12. The process of claim 2 in which the α-olefin is 4-methyl-pentene-1.

References Cited

UNITED STATES PATENTS

| | | | |
|---|---|---|---|
| 2,981,725 | 4/1961 | Luft | 260—94.9 |
| 3,008,943 | 11/1961 | Guyer | 260—94.9 |
| 3,058,963 | 10/1962 | Vandenberg | 260—94.9 |

JOSEPH L. SCHOFER, *Primary Examiner.*

M. B. KURTZMAN, *Assistant Examiner.*